June 15, 1926.
J. H. CLARK
1,588,942
AUTOMATIC COUPLER FOR VEHICLES
Filed Feb. 26, 1923
2 Sheets-Sheet 1
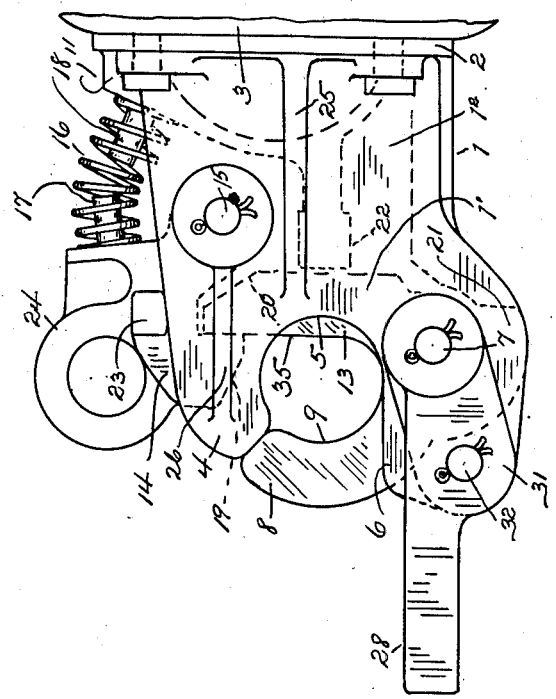
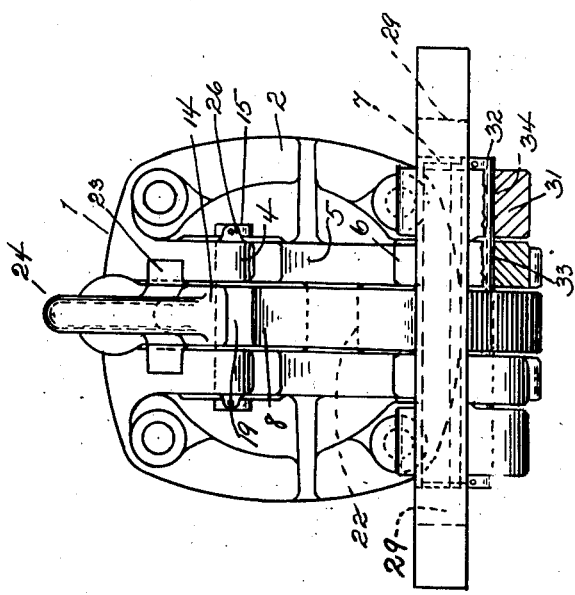
Inventor
James Harry Clark
By Whittemore Hulbert Whittemore & Belknap
Attorneys

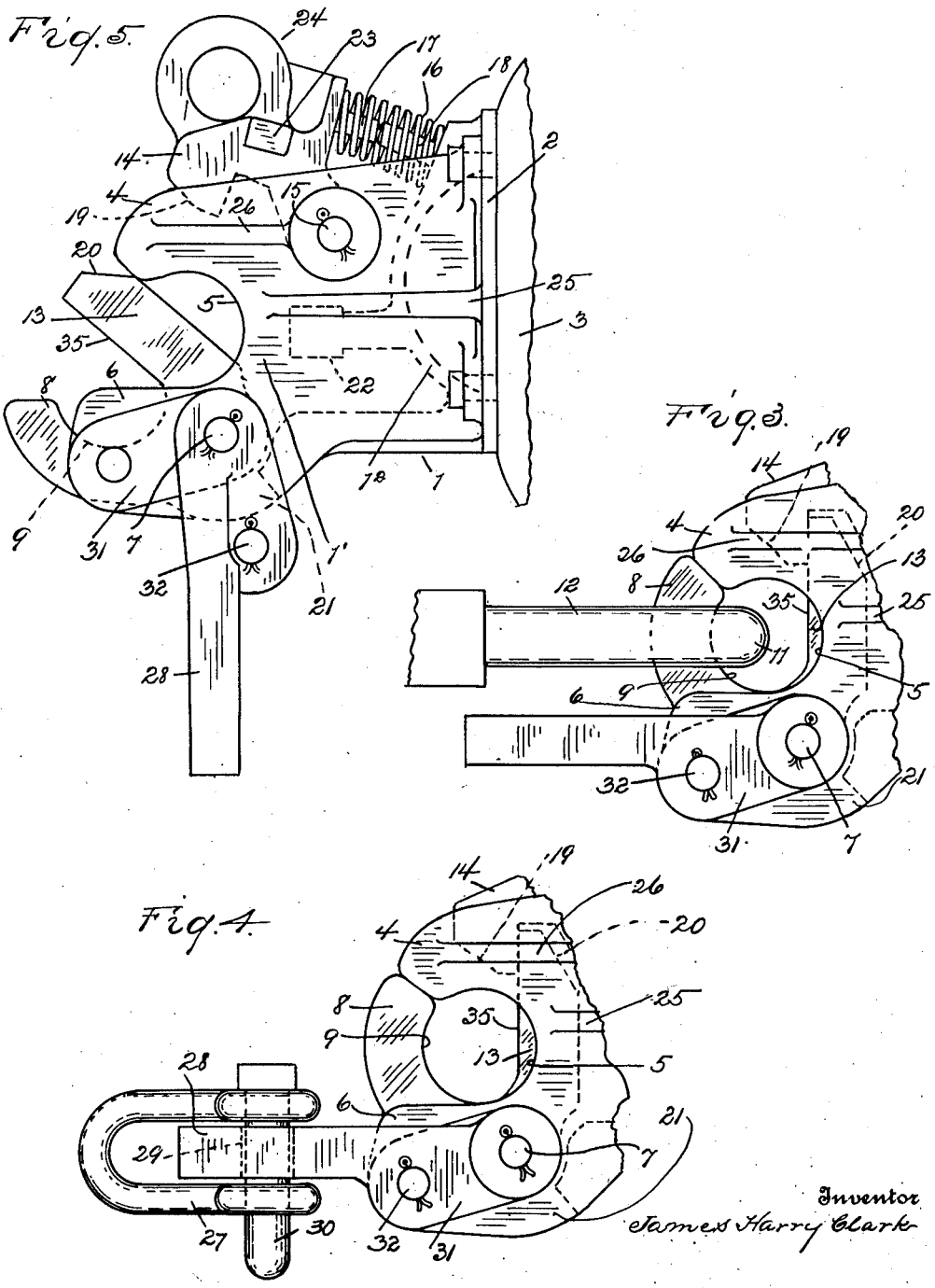

Patented June 15, 1926.

1,588,942

UNITED STATES PATENT OFFICE.

JAMES HARRY CLARK, OF RIVER ROUGE, MICHIGAN.

AUTOMATIC COUPLER FOR VEHICLES.

Application filed February 26, 1923. Serial No. 621,446.

This invention relates to draft appliances and refers more particularly to couplers for vehicles.

An object of the invention is to provide a simple and reliable coupler which operates automatically for connecting one vehicle to the drawbar of another vehicle.

Another object is to provide a coupler which may also be easily and quickly connected to the usual clevis of a machine or implement.

Another object is to provide a strong and durable construction which may be manufactured at a comparatively low cost.

With the above and other objects in view, the invention consists of certain novel features of construction, combination and arrangement of parts as will be more fully described and particularly pointed out in the appended claims.

In the accompanying drawings:

Figure 1 is a rear elevation of a coupler embodying my invention;

Figure 2 is a side elevation thereof and showing the same connected to the rear axle housing of a tractor;

Figure 3 is a fragmentary elevation of the coupler and showing a drawbar connected thereto;

Figure 4 is a view similar to Figure 3 but showing a clevis connected thereto;

Figure 5 is a side elevation of the coupler and showing the U-shaped jaw in lowered position.

Referring now to the drawings in which like characters of reference designate corresponding parts throughout the several views, the numeral 1 designates a coupler head comprising parallel vertical side portions 1' and a transversely extending portion 1" connecting the side portions together at the forward end thereof. Apertured flanges 2 extend laterally from the side portions 1' of the head at the forward end thereof and are detachably secured to the rear axle housing 3 of a tractor. A pair of spaced parallel curved jaws 4 extend rearwardly from the side portions 1' of the head at the upper end thereof and connect into curved portions 5 of the sides at the rear end of the head while a pair of spaced parallel horizontal arms 6 project rearwardly from the side portions of the head at the lower end thereof and also connect into the curved portions 5.

A removable horizontal pivot pin 7 extends through the arms 6 and supports a substantially U-shaped jaw 8 which is adapted to move between the side portions of the head. One arm of the jaw 8 is preferably curved as shown at 9 and is adapted to cooperate with the jaws 4 to form an eye to receive the eye 11 of a vehicle drawbar 12. The other arm 13 is preferably straight and is adapted to engage a hooked member 14 which is pivoted upon a removable horizontal pin 15 extending through the side portions of the head. The hooked member is adapted to retain the pivoted jaw in raised position and is normally retained in the path thereof by means of a coil spring 16 which surrounds a pair of opposed pegs 17 and 18 respectively upon the hooked member 14 and transversely extending portion 1" of the head. The hooked member is preferably provided with an inclined portion 19 which is adapted to be engaged by an inclined portion 20 of the arm 13 when the jaw 8 is moved upwardly.

A lug 21 is formed integral with the curved arm 9 of the jaw and is adapted to engage the lower end of the transversely extending portion of the head 1 to limit the downward movement of the jaw, while a horizontal web 22 is formed integral with the side portions 1' and transversely extending portion 1" of the head and is adapted to engage the arm 13 of the jaw 8 to limit the upward movement of the jaw. A pair of lugs 23 extend outwardly from the sides of the hooked member 14 and are adapted to engage the head 1 to limit the downward movement of the hooked member. A suitable loop 24 is preferably formed upon the hooked member and is adapted to be lifted manually to raise the hooked member to release the jaw 8.

Horizontal webs 25 are preferably formed integral with the flanges 2 and the sides of the head 1 to strengthen the same, while horizontal webs 26 are preferably formed integral with the jaws 4 to strengthen the same.

Should it be desired to connect the coupler to the usual clevis 27 of a machine or implement (not shown) there is a relatively long transversely extending bar 28 which is provided with spaced openings 29 for engagement with the pin 30 of the clevis and which is also provided with spaced parallel forwardly extending lugs 31 that are pivotally mounted upon the pin 7. This bar may be raised manually to a horizontal position and may be retained in this position by means of a pin 32 which is adapted to extend through openings 33 and 34 respectively in the arms 6 and the lugs 31.

In use, when it is desired to connect the coupler to the drawbar 12, the eye 11 thereof may be engaged forcibly with the rear side 35 of the arm 13 which will cause the jaw 8 to move upwardly and to engage the hooked member 14. This hooked member will then move against the tension of the spring 16 until the arm 13 is beyond the hooked portion of the member 14 whereupon the spring will move the hooked member downwardly with the result that the jaw 8 will be retained in raised position and the eye 11 of the drawbar will be retained between the jaws 4 and 8 respectively.

When it is desired to use the bar 28, the jaw 8 is preferably moved upwardly to locked position and the bar is moved to a horizontal position where it may be retained by means of the pin 32. The pin 30 of the clevis may then be placed in any of the openings 29 in the bar.

While it is believed that from the foregoing description, the nature and advantages of the invention will be readily apparent, I desire to have it understood that I do not limit myself to what is herein shown and described and that such changes may be resorted to when desired, as fall within the scope of what is claimed.

What I claim as my invention is:

1. In a coupler, the combination with a stationary jaw, a head carrying said jaw and a movable jaw adapted to cooperate with said stationary jaw to connect said coupler to one member, means for automatically locking said movable jaw in cooperative position, and a member movable upon said head independently of the jaw aforesaid and adapted to form a draft connection to another member.

2. In a coupler, the combination with a stationary jaw having a movable jaw adapted to cooperate therewith to connect said coupler to one member, means, automatically responding to actuation of the movable jaw to its cooperative position for locking said jaw in said position, an apertured member movable to a horizontal position to be connected to another member, and removable means for retaining said apertured member in horizontal position.

3. In a coupler, the combination with a head having a jaw, of a substantially U-shaped jaw pivotally mounted on said head and adapted to cooperate with the jaw aforesaid to connect said coupler to a drawbar, a web upon said head for limiting movement of said U-shaped jaw in one direction, a lug upon said U-shaped jaw engageable with said head for limiting movement of the said jaw in the opposite direction, and means engageable with one arm of said jaw and operable automatically for retaining said jaw in cooperative position.

4. In a coupler, the combination with a head having a jaw, of a substantially U-shaped jaw pivotally mounted in said head one arm thereof being adapted to cooperate with the jaw aforesaid to connect said coupler to a drawbar, a hooked member pivotally mounted on said head and adapted to engage one arm of said jaw to retain the said jaw in cooperative position, a lug upon said hooked member engageable with said head for limiting movement of said hooked member in the other direction, and yieldable means for also moving said hooked member to locked engagement with said U-shaped jaw when the latter is in cooperative position.

5. In a coupler, the combination with a head having a pair of jaws, arms extending from said head, and carrying said jaws, a draft jaw adapted to cooperate with the jaws aforesaid and engageable by a drawbar, an apertured bar adapted to be connected to a clevis, and a common pivot carried by said arms for said bar and the second-mentioned jaw.

6. In a coupler, the combination with a head having a jaw, arms extending from said head, a jaw adapted to cooperate with the jaw aforesaid to connect said coupler to a drawbar, an apertured bar adapted to be connected to a clevis, a common pivot carried by said arms for said bar and the second-mentioned jaw, a hooked member for retaining the second-mentioned jaw in cooperative position, and a removable pin engageable with said arms for retaining said bar in position to be connected to said clevis.

7. In a coupler, the combination with a head having a fixed jaw, of a co-acting jaw pivotally mounted on said head and movable to and from the fixed jaw, a web upon said head limiting movement of the pivotal jaw in one direction, a lock upon said pivotal jaw engageable with said head for limiting movement of said jaw in the opposite direction, and means automatically engageable with said pivotal jaw in its position of co-action with the fixed jaw to maintain said position.

8. A coupler comprising a head having spaced projecting portions terminally jointly forming a jaw, a co-acting jaw pivoted between said projecting portions, and a latch member likewise pivoted between said portions, and automatically engageable with said pivotal jaw to maintain its position of use.

9. A coupler comprising a head having parallel spaced projections integrally forming a jaw, a co-acting jaw pivoted between said projections, and movable to and from a co-acting relation with the first named jaw, a latch member likewise pivoted between said spaced projections, and automatically engageable with said pivotal jaw to maintain its position of co-action with the first named jaw, and a lug upon said latch member engageable with one of said projections of the head to determine the normal position of said latch member.

10. A coupler comprising a head having a pair of spaced projections terminally jointly forming a jaw, a co-acting jaw pivotally mounted between said projections and adapted to function as a draft member in its position of co-action with the first named jaw, an alternative pivotal draft member having portions embracing said projections of the head, and a common means for pivoting said draft jaw and alternative draft member upon the head.

11. A coupler comprising a head having an opening for receiving a draw-bar, a member pivotal on said head and movable to and from a position closing said opening, a draft member pivoted on said head at one side of said opening for alternative use, and a pin for detachably connecting said alternative draft-bar to the head in the position of use of said bar.

In testimony whereof I affix my signature.

JAMES HARRY CLARK.